United States Patent
Zimmerer et al.

(10) Patent No.: US 7,996,633 B2
(45) Date of Patent: Aug. 9, 2011

(54) SEQUENCING TRANSACTIONS AND OPERATIONS

(75) Inventors: Peter K. Zimmerer, Walldorf (DE); Stefan Dipper, Wiesloch (DE); Stefan Biedenstein, Bad Schoenborn (DE); Rainer Brendle, Neckargemüend (DE)

(73) Assignee: SAP AG, Walldorf (DE)

( * ) Notice: Subject to any disclaimer, the term of this patent is extended or adjusted under 35 U.S.C. 154(b) by 261 days.

(21) Appl. No.: 11/490,841

(22) Filed: Jul. 21, 2006

(65) Prior Publication Data

US 2008/0022059 A1    Jan. 24, 2008

(51) Int. Cl.
G06F 12/00    (2006.01)
G06F 13/00    (2006.01)
G06F 13/28    (2006.01)

(52) U.S. Cl. ................ 711/156; 711/162; 707/704

(58) Field of Classification Search .......... 711/162, 711/156; 707/204, 704

See application file for complete search history.

(56) References Cited

U.S. PATENT DOCUMENTS 5,737,611 A * 4/1998 Vicik ............................ 710/200

* cited by examiner

*Primary Examiner* — Stephen C Elmore
*Assistant Examiner* — Mark A Giardino, Jr.
(74) *Attorney, Agent, or Firm* — Mintz, Levin, Cohn, Ferris, Glovsky & Popeo, P.C.

(57) ABSTRACT

Systems and techniques for sequencing transactions and operations. In one aspect, an article includes one or more machine-readable media storing instructions operable to cause one or more machines to perform operations. The operations include identifying a delta of a first data store, and replicating the delta, including the transaction, to a second data store. The delta comprising a collection of changes to the first data store since a previous replication. The delta includes a transaction that began before the previous replication but did not commit before the previous replication replicated data from the first data store.

13 Claims, 8 Drawing Sheets

--PRIOR ART--

FIG. 4

--PRIOR ART--

FIG. 5

--PRIOR ART--

SEQUENCING TRANSACTIONS AND OPERATIONS

BACKGROUND

This disclosure relates to the sequencing of interactions with a data store.

A data processing system can interact with a data store in a variety of different ways.

For example, a data processing system can change the data stored in a data store. Example changes include the deletion of data, the addition of data, and the modification of data in a data store. Such changes can be set forth in a transaction. A transaction is a group of related changes to a data store. The related changes in a transaction are inseparable in that they must all be executed, or all remain unexecuted, if the integrity of the data store is to be maintained. The changes in a transaction are written to a data store as a single unit during a commit, independently of other transactions. By placing related changes within a single, independent transaction, the logical consistency of a data store can be maintained.

Another example of interaction between a data processing device and a data store is the performance of an operation by the data processing device on a data store. An operation uses the existing data in a data store, generally without making changes to that data. Example operations include the partitioning of a data store, the replication of a data store, and the synchronization of a data store with other partitions in a data processing system landscape.

SUMMARY

The present inventors have recognized that certain transactions may be inadvertently omitted from operations performed on a data store due to improper sequencing of the transactions and the operations. To address such omissions, they have developed systems and techniques for sequencing transactions and operations. In one aspect, an article includes one or more machine-readable media storing instructions operable to cause one or more machines to perform operations. The operations can include identifying a delta of a first data store, and replicating the delta, including the transaction, to a second data store. The delta comprising a collection of changes to the first data store since a previous replication. The delta includes a transaction that began before the previous replication but did not commit before the previous replication replicated data from the first data store.

This and other aspects can include one or more of the following features. The delta can be identified by identifying one or more business objects with content that has been changed. The delta can be replicated by replicating at least the changed content of the one or more business objects into a data schema.

In another aspect, an article includes one or more machine-readable media storing instructions operable to cause one or more machines to perform operations. The operations can include obtaining, before a transaction is committed, a first identifier that is unique but not necessarily ordered, associating the first identifier with the transaction, obtaining, after the first identifier has been obtained, a sequence identifier that is both unique and ordered, and associating the sequence identifier with the first identifier and with the transaction.

This and other aspects can include one or more of the following features. An operation can be prevented from obtaining a second sequence identifier until after the sequence identifier has been obtained, e.g., by preventing an operation from preventing other processes from accessing a source of sequence numbers or by preventing the operation from instituting an exclusive lock on the source of sequence numbers.

The operations can also include preventing an operation from obtaining a second sequence identifier until after the transaction has been committed. The sequence identifier can be associated with the first identifier by writing the sequence identifier and the first identifier to a transaction log.

In another aspect, an article includes one or more machine-readable media storing instructions operable to cause one or more machines to perform operations. The operations can include determining if a change is being made to a data store, preventing other processes that interact with the data store from obtaining sequence numbers from a source of sequence numbers if it is determined that no change is being made, obtaining a sequence number for an operation from the source of sequence numbers, and releasing the source of sequence numbers so that other processes can obtain sequence numbers from the source of sequence numbers.

This and other aspects can include one or more of the following features. Determining if the change is being made to the data store can include determining if a transaction has instituted a shared lock on the source of sequence numbers. Data in the data store can be replicated after the other processes are prevented from obtaining sequence numbers from the source of sequence numbers.

In another aspect, an article includes one or more machine-readable media storing instructions operable to cause one or more machines to perform operations. The operations can include identifying transactions performed on a data store using first identifiers that are unique but not necessarily ordered, wherein each first identifier is associated with a single transaction, and sequencing the transactions and operations using sequence identifiers that are both unique and ordered, wherein each sequence identifier is associated with a single transaction or a single operation.

This and other aspects can include one or more of the following features. Both the first identifiers and the sequence identifiers can include time stamps. The sequence identifiers for the transactions and the operations can be obtained from a same function.

The operations can also include storing a specific first identifier associated with a specific transaction in association with a specific sequence identifier for the same specific transaction. For example, the specific first identifier and the specific sequence identifier can be stored together in a record in a transaction log.

In another aspect, an article includes one or more machine-readable media storing instructions operable to cause one or more machines to perform operations. The operations can include obtaining a first sequence number for a first transaction from a sequence number source and obtaining, when the first period of time and any additional periods of time have ended, the second sequence number for the operation.

The first sequence number can be obtained by preventing an operation from obtaining a second sequence number for a first period of time and allowing, during the first period of time, one or more additional transactions to obtain additional sequence numbers and to prevent the operation from obtaining the second sequence number for additional periods of time. The additional periods of time can overlap with the first period of time. The sequence numbers can be used by a data processing system to sequence transactions and operations.

This and other aspects can include one or more of the following features. The second sequence number can be obtained by preventing transactions from obtaining sequence numbers. The first transaction can always be committed during the first period of time.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
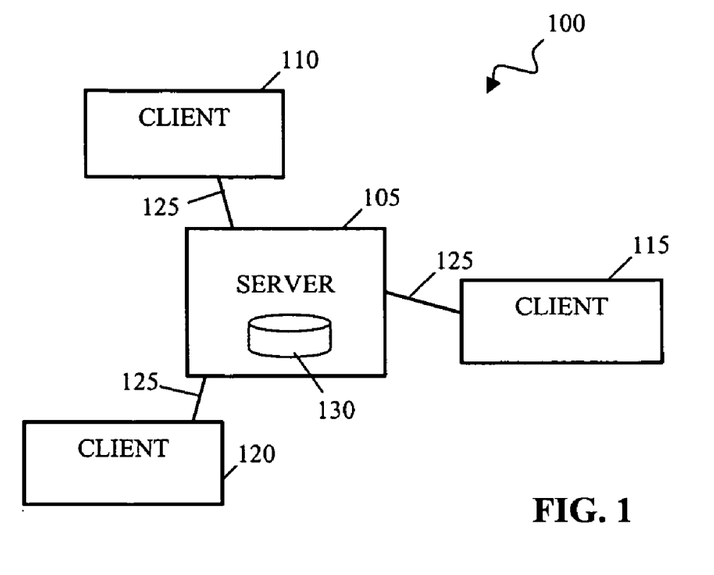
FIG. 1 is a schematic representation of a data processing system landscape.

FIG. 1 is a schematic representation of a distributed data processing system landscape 100. A distributed data processing system landscape can include a collection of data processing devices, software, and/or systems (hereinafter "data processing systems") that operate autonomously yet coordinate their operations across data communication links in a network. By operating autonomously, the data processing systems can operate in parallel, handling local workloads of data processing activities. The data communication link allows information regarding the activities, including the results of performance of the activities, to be exchanged between data processing systems. To these ends, many distributed data processing systems include shared data stores and system-wide rules for the exchange of data.

System landscape 100 thus is a collection of data processing systems that exchange information for the performance of one or more data processing activities in accordance with the logic of a set of machine readable instructions. System landscape 100 includes one or more servers 105 that are in communication with a collection of clients 110, 115, 120 over a collection of data links 125.

Server 105 is a data processing system that provides services to clients 110, 115, 120. The services can include, e.g., the provision of data, the provision of instructions for processing data, and/or the results of data processing activities. The services can be provided in response to requests from clients 110, 115, 120.

Server 105 can manage one or more data stores 130. A data store stores an organized set of persistent information. The information can be facts, machine-readable instructions for performing operations, combinations of the two, and the like. The information can be stored in a variety of different data structures and data formats, including, e.g., data objects, tables, lists, arrays, schemata, and the like. Server 105 can provide for the storage, organization, retrieval, and presentation of instructions and data to and from data store 130 by one or more of clients 110, 115, 120. Server 105 can also manage data store 130 to ensure the integrity and quality of the stored information. For example, server 105 can perform database management system operations in accordance with the logic of a set of machine-readable instructions for managing and querying the stored information.

Clients 110, 115, 120 are data processing systems that receive services from server 105. Clients 110, 115, 120 can be responsible for other data processing activities, such as managing interaction with human users at their respective locations. Clients 110, 115, 120 can generate requests for such services and convey the requests to server 105 over one or more of data links 125.

Data links 125 can form a data communication network such as a LAN, a WAN, or the Internet. System landscape 100 can also include additional data links, including direct links between clients 110, 115, 120 and data links to systems and devices outside landscape 100, such as a communications gateway (not shown).

The roles of "server" and "client" can be played by the same individual data processing systems in system landscape 100. For example, the data processing system denoted as server 105 may receive certain services from one of clients 110, 115, 120. Thus, a data processing system may be a "server" in the context of a first set of services but a "client" in the context of a second set of services.

Figure 2:
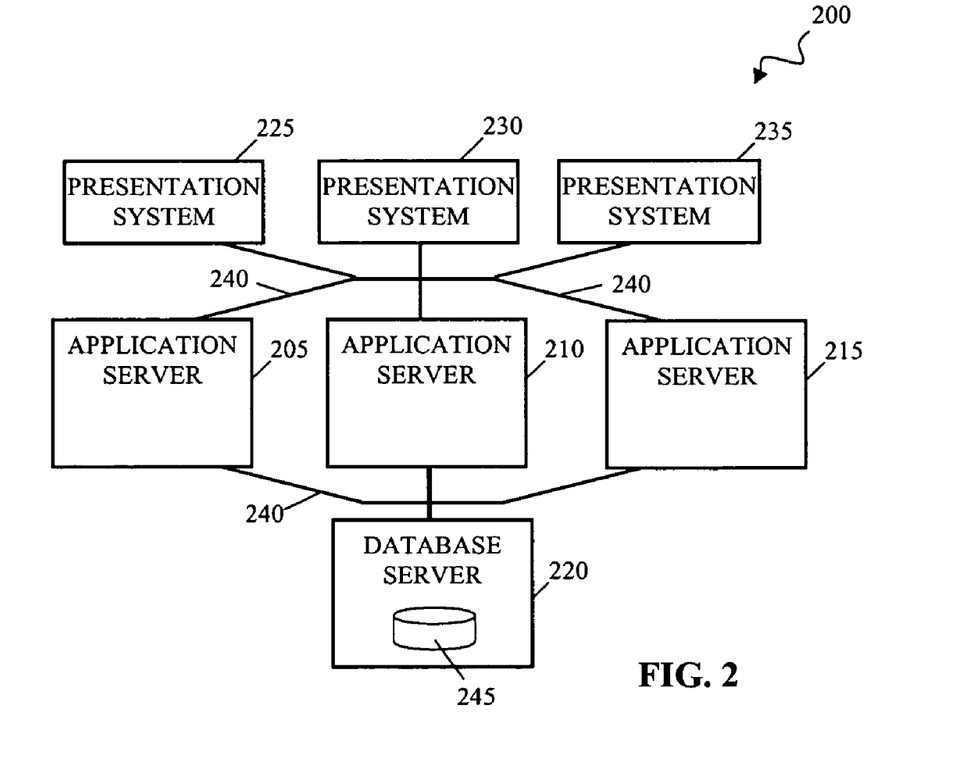
FIG. 2 is a schematic representation of one implementation of the system landscape of FIG. 1.

FIG. 2 is a schematic representation of another implementation of a system landscape, namely, a system landscape 200. System landscape 200 is a three tiered hierarchy of data processing systems and includes application servers 205, 210, 215 and one or more database servers 220. Application servers 205, 210, 215 and database server 220 are in data communication with each other and with a collection of presentation systems 225, 230, 235 over a collection of data links 240.

Application servers 205, 210, 215 are data processing systems that provide services to presentation systems 225, 230, 235 and/or database server 210. Each application server 205, 210, 215 can provide services in accordance with the logic of one or more software modules, such as the module of enterprise software.

Database server 220 is a data processing system that manages one or more databases 245. A database is one class of data store. Server 220 can manage database 245 in accordance with the logic of a database management system.

Presentation systems 225, 230, 235 are data processing systems that receive services from application servers 205, 210, 215 and database server 220. Presentation systems 225, 230, 235 can also manage interaction with human users at their respective locations, such as the display of information on a graphical user interface. Presentation systems 225, 230, 235 can generate requests for services and convey the requests to application servers 205, 210, 215 and database server 220 over one or more of data links 240.

In system landscapes such as landscapes 100, 200, the number of transactions executed upon data stores 130, 245 can become very large. For example, as the number of clients and/or presentation systems increases, the data processing activities in landscapes 100, 200 can result in a near continuous stream of transactions that are to executed upon data stores 130, 245. The sequencing of such transactions can help ensure that operations performed on data stores 130, 245 are effective.

Figure 3:
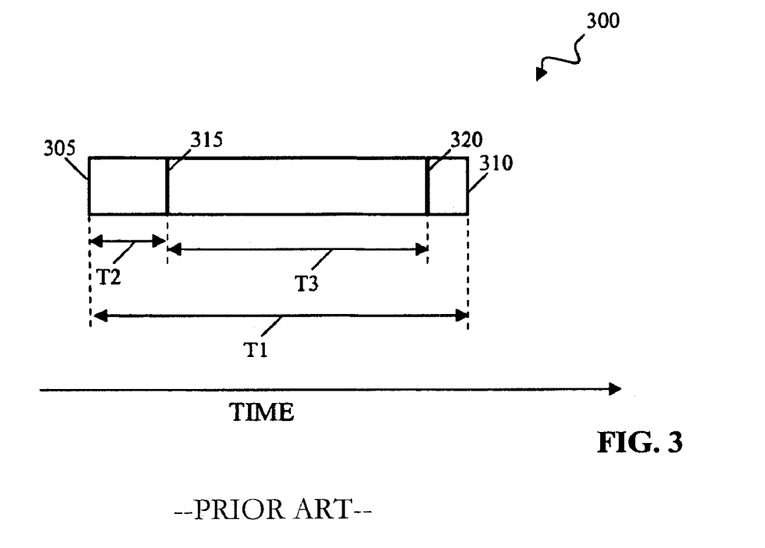
FIG. 3 is a diagrammatic representation of a transaction.

FIG. 3 is a diagrammatic representation of a first kind of transaction, namely a transaction 300. Transaction 300 includes one or more data processing activities in which data in a data store are changed. For example, transaction 300 can include one or more insertions, updates, and/or deletions.

Transaction 300 starts at 305, continues for a period of time T1, and ends at 310. During period T1, various data processing activities are performed as part of transaction 300. For example, a transaction identifier that is unique in time to the system landscape is obtained for transaction 300 at 315 at some time T2 after 305. One example of such an identifier is a time stamp, which is used hereinafter to refer to such identifiers. The time stamp generally identifies an instant in T1 and is used to uniquely identify and sequence transaction 300 to systems in a data processing landscape. Further, transaction 300 is committed at 320 at some time T3 after a time stamp is obtained. A commit ends a transaction by making all changes permanent.

Figure 4:
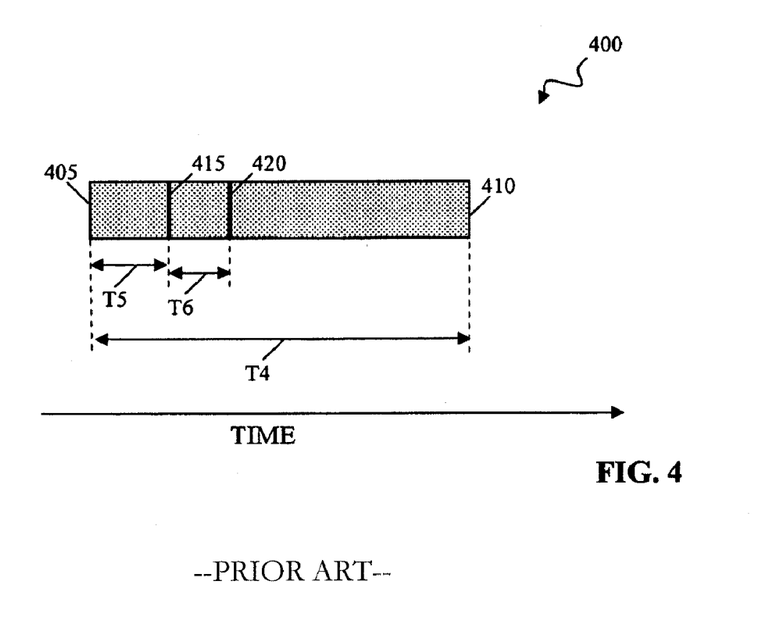
FIG. 4 is a diagrammatic representation of an operation.

FIG. 4 is a diagrammatic representation of a second kind of transaction, namely an operation 400. Operation 400 includes one or more data processing activities in which data in a data store are used, generally without making changes to that data. For example, transaction 400 can be a partitioning, a replication, or a synchronization of a data store.

Operation 400 starts at 405, continues for a period of time T4, and ends at 410. During period T4, various data processing activities are performed as part of operation 400. For example, a time stamp for operation 400 is obtained at 415 at some time T5 after the start of operation 400. The time stamp is generally associated with an instant in T4 and is used to uniquely identify and sequence transaction 400 to systems in a data processing landscape. Also, operation 400 starts use of the data in a data store at some time T6 after a time stamp is obtained. Operation 400 thus relies upon the consistency of the data in the data store after T6.

The present inventors have recognized that changes made during certain transactions may be inadvertently omitted from certain operations performed on a data store. These omissions are due to improper sequencing of transactions and operations. Such an improper sequencing may arise when time T3 in a transaction is not identical to time T6 in an operation.

Figure 5:
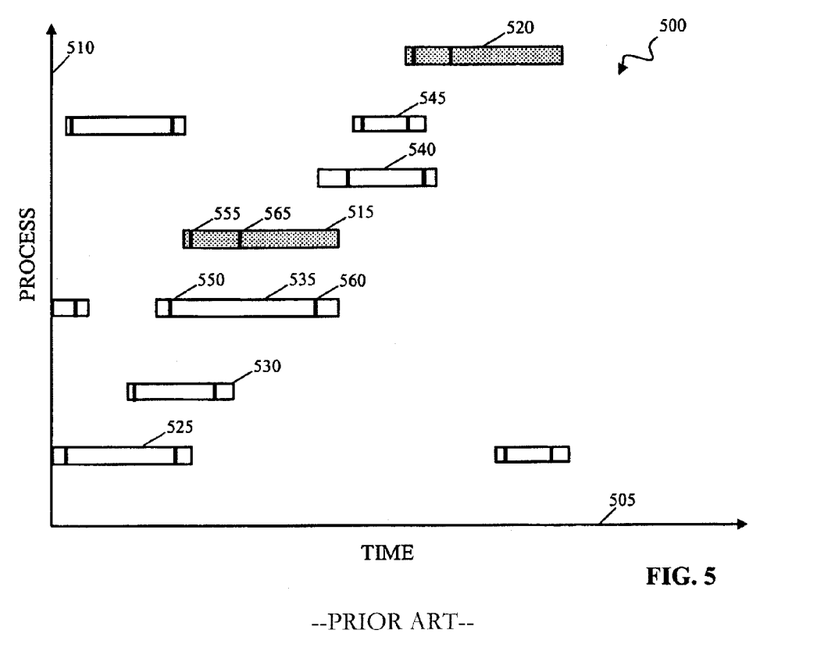
FIG. 5 is a graph that schematically illustrates how the transaction and the operation of FIGS. 3 and 4 can be improperly sequenced.

FIG. 5 is a graph 500 that schematically illustrates one such situation, namely, when time T3 in a transaction is longer than a time T6 in an operation. Graph 500 includes a time axis 505 and a process axis 510. Time axis 505 denotes time, whereas process axis 510 denotes different processes in a data processing system landscape.

A collection of interactions between a data processing system and a data store occur during the period illustrated in graph 500. In particular, a pair of operations 515, 520 and a number of transactions 525, 530, 535, 540, 545 occur.

As can be seen, transaction 535 obtains a time stamp at 550 before operation 515 obtains a time stamp at 555. Since these time stamps are used in a data processing system landscape to sequence transactions 535 and operation 515, transaction 535 is treated by a system landscape as having occurred before operation 515. However, transaction 535 commits at 560 after operation 515 starts to make use of the data at 565. The change made in transaction 535 may be wholly or partly unavailable to operation 515 although the time stamps indicate otherwise. The extent of this unavailability may depend on the isolation level in any relational database management system in the system landscape.

Such discrepancies are particularly insidious when operation 515 is an operation that is performed on the "delta" of a data store. The delta of a data store is the portion of a data store that has changed since a previous, corresponding operation. For example, assume that the entirety of a first data store is replicated in a second data base. Such replications can be performed, e.g., to transfer information between two data stores that use different schemata or between two data stores that are at different, remote locations. After subsequent changes to the first data store, there is no need to again replicate the entire first data store to ensure that all information is transferred to the second data store. Rather, the changes to the first data store (i.e., the delta) can be replicated in a series of batches independently of the unchanged portions of the first data store. Such batchwise replication can be used to maintain consistency between the first data store and the second data store.

The discrepancies between when transactions are labeled as having occurred and when changes to the data in the data store are actually made could cause a data processing system to fail to transfer all information and lead to inconsistencies in data stores. For example, in the context of FIG. 5, the change made by transaction 535 has not been committed at 560 when operation 515 starts to rely on the data in the data store at 565. Such an omission is, in itself, not problematic for operation 515 since other, subsequent changes made by other transactions (e.g., transactions 540, 545) are also omitted from operation 515.

However, because operation 515 is labeled with a time stamp at 555 that places operation 515 in sequence after transaction 535, operation 515 appears to the data processing system to have used the change of transaction 535. In other words, a data processing system cannot distinguish between the changes made in transactions 525, 530 (which are used by operation 515) and the change of transaction 535 (which is not used by operation 515).

As a consequence of this indistinguishability of the changes made by transactions 525, 530, 535, a subsequent corresponding operation 520 that operates on the "delta" of a data store could ignore the change made by transaction 535. For example, operation 520 could simply examine a list or other data record of changes made after time stamp 555 to determine the delta. Such an examination would omit the change made by transaction 535, leading to data inconsistency.

Figure 6:
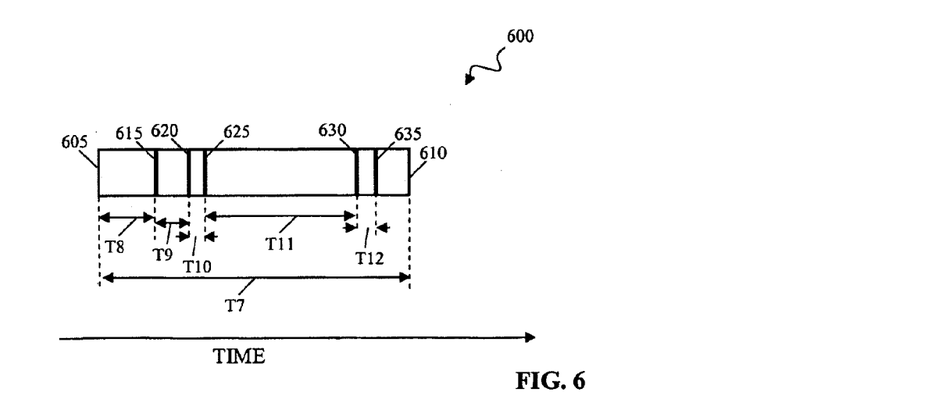
FIG. 6 is a diagrammatic representation of another transaction.

FIG. 6 is a diagrammatic representation of a transaction 600 that addresses the discrepancies between when transactions are labeled as having occurred and when changes to data in a data store are actually made. Transaction 600 starts at 605, continues for a period of time T7, and ends at 610. During period T7, various data processing activities are performed as part of transaction 700. For example, a transaction ID is obtained for transaction 600 at 615 at some time T8 after 605. As used herein, a transaction ID is a unique but not necessarily ordered identifier. A transaction ID is typically a number, such as a big-endian timestamp. In some implementations, a transaction ID can include a spatial portion in addition to a timestamp or other temporal portion. The spatial portion can identify the source of the transaction ID and allow multiple sources to concurrently generate transaction ID's in the same system landscape. A transaction ID can thus be a universally unique identifier (UUID). The transaction ID is associated with transaction 600 and can be used to uniquely identify transaction 600 to systems in a data processing landscape. However, since transaction ID's of different transactions 600 are not necessarily ordered, a transaction ID is not used to sequence transactions.

As another example of data processing activities in transaction 600, a shared lock is instituted on a source of a sequence number at 620 at some time T9 after 615. A shared lock is a state of a resource where access is available from multiple processes (such as other transactions 600) but the setting of an exclusive lock is prevented. In the context of a source of a sequence number, the action whereby the next sequence is obtained (i.e., "get next sequence number") is also prevented. Multiple processes can set concurrent shared locks for the same resource. The resource can be, e.g., a data record such as a data object.

The source of the sequence number can be a source of a monotonically increasing identifier. For example, sequence number can be obtained using a procedure call or a function module call to a set of machine-readable instructions for obtaining a time stamp, such as the function module TRFC_GET_COUNTER in the SAP Netweaver and R/3 systems, which returns a monotonically increasing number that is unique to a data processing system landscape.

As another example of data processing activities in transaction 600, a sequence number is obtained for transaction 600 at 625 at some time T10 after 620. As used herein, a sequence number is an ordered identifier of a transaction that is unique to the system landscape. A sequence number is typically a monotonically increasing number, such as a timestamp. The sequence number is associated with transaction 600 and can be used by systems in a data processing landscape to sequence a collection of transactions.

As another example of data processing activities in transaction 600, transaction 600 is committed at 630 at some time T11 after a sequence number is obtained. The commit makes the changes in transaction 600 permanent.

As another example of data processing activities in transaction 600, the shared lock on the source of a sequence number is released at 635 at some time T12 after 630. Since the shared lock is released only by transaction 600, other concurrent shared locks, instituted by other processes, may still prevent the modification and the setting of an exclusive lock on the source of the sequence number.

Figure 7:
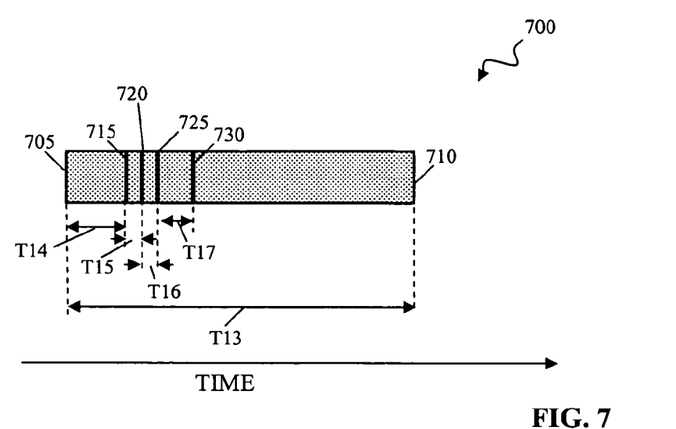
FIG. 7 is a diagrammatic representation of another operation.

FIG. 7 is a diagrammatic representation of an operation 700 that also addresses the discrepancies between when changes are labeled as having occurred and when changes actually do occur. Operation 700 starts at 705, continues for a period of time T13, and ends at 710. During period T13, various data processing activities are performed as part of operation 700. For example, an exclusive lock is instituted on the source of a sequence number at 715 at some time T14 after 705. An exclusive lock is a state of a data record wherein read and write access are available only to a single process, such as a single operation 700. Other processes are thus prevented from accessing an exclusively locked data record. Further, the setting of a shared lock is also prevented during this time. An exclusive lock thus cannot be concurrent with another exclusive lock or with a shared lock. The data record can be, e.g., a data object.

As another example of data processing activities in operation 700, a sequence number is obtained for operation 700 at 720 at some time T15 after 715. The sequence number is associated with operation 700 and can be used by systems in a data processing landscape to sequence a collection of transactions.

As another example of data processing activities in operation 700, the exclusive lock on the source of a sequence number is released at 725 at some time T16 after 720. Once the exclusive lock is released by operation 700, other processes can access the source of a sequence number and/or institute locks on the source.

As another example of data processing activities in operation 700, operation 700 starts use of the data in a data store at some time T17 after the release of the exclusive lock at 725.

Figure 8:
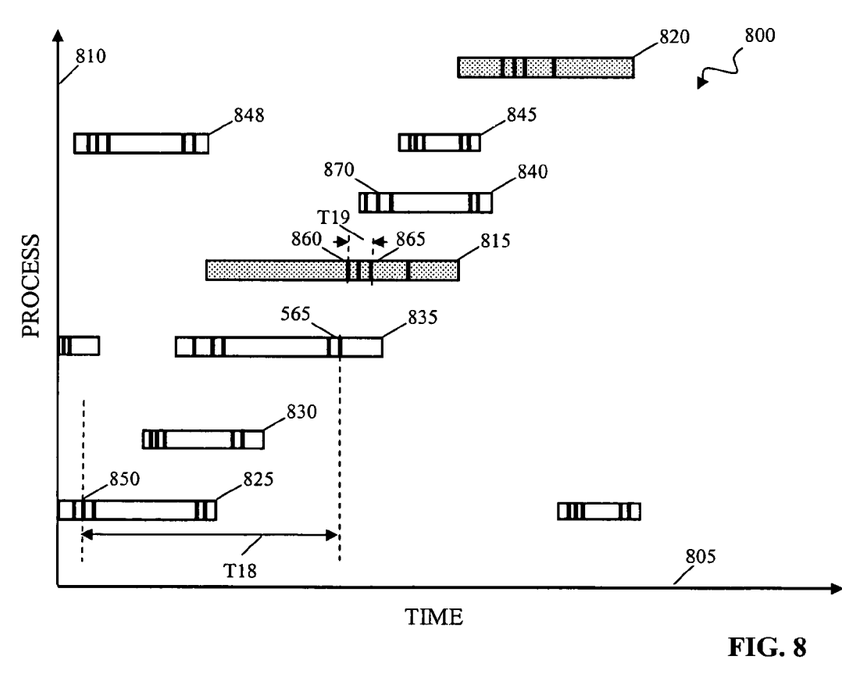
FIG. 8 is a graph that schematically illustrates how the transaction and the operation of FIGS. 6 and 7 are properly sequenced.

FIG. 8 is a graph 800 that schematically illustrates how a collection of transactions 600 and operations 700 can be used to maintain data consistency. Graph 800 includes a time axis 805 and a process axis 810. Time axis 805 denotes time, whereas process axis 810 denotes various processes in a data processing system landscape.

A pair of operations 815, 820 and a number of transactions 825, 830, 835, 840, 845, 848 occur during the period illustrated in graph 500. As can be seen, transaction 825 institutes a shared lock on a source of a sequence number at 850. This shared lock stops other processes, such as transactions and operations 815, 820, 825, 830, 840, 845, 848, from modifying or instituting an exclusive lock on the sequence number source. A series of successive, overlapping shared locks are instituted and released by transactions 830, 835, 848 so that the sequence number source remains in the shared lock state for time T18.

Operation 815 attempts to institute an exclusive lock during time T18 but fails to do so until all successive shared locks are released. Operation 815 then institutes and exclusive lock at 860 and releases it at 865. The sequence number source thus remains in the exclusive lock state for time T19. Once the exclusive lock is released, other transactions can access the sequence number source and institute a shared lock on the sequence number source. For example, transaction 840 can institute a shared lock on the sequence number source at 870.

In this way, the sequence numbers of transactions are ensured to correspond to the true sequence of the transactions. An operation cannot obtain a sequence number while the shared lock of a transaction is maintained. Since such shared locks are only released after a commit, no operation will mistakenly be labeled as having occurred before the commit in a transaction.

Thus, when successive use operations are performed on the delta of a data store, the delta will truly reflect the changes made between use operations and no changes will be inadvertently omitted.

Please note that, in some implementations, the sequence of successive transactions without an intermediate operation, such as transactions 825, 830, 835, can also be defined by one or more processes. For example, "application logging" can be used to avoid having concurrent transactions change the same data. Such application logging can result in the sequence numbers of transactions between two consecutive operations departing from the time order of commits.

Figure 9:
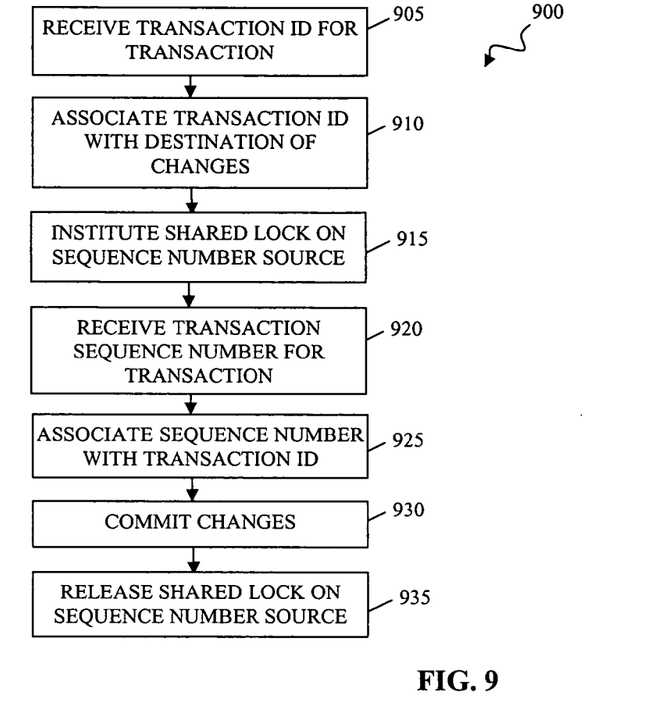
FIG. 9 is a flowchart of a process performed during a transaction.

FIG. 9 is a flowchart of a process 900 performed during a transaction, such as transaction 600 (FIG. 6). Additional data processing activities can be performed during a transaction, however, the illustrated activities clarify the transaction by example.

The system performing process 900 can receive a transaction ID for the transaction at 905. As discussed above, a transaction ID is a unique but not necessarily ordered identifier of the transaction.

The system can also associate the transaction ID with the destination of the changes set forth in the transaction at 910. For example, when the changes are to be made to a record of a database table, the transaction ID can be assigned to that record before the changes are actually persisted.

The system can also institute a shared lock on sequence number source at 915. As discussed above, a shared lock allows other processes to read from the sequence number source and to institute successive, overlapping shared locks on the sequence number source. However, the setting of an exclusive lock, for example, by an operation, is prevented.

The system can receive a sequence number for the transaction from the sequence number source at 920. As discussed above, a sequence number is a unique and ordered identifier, such as a monotonically increasing number.

Figure 10:
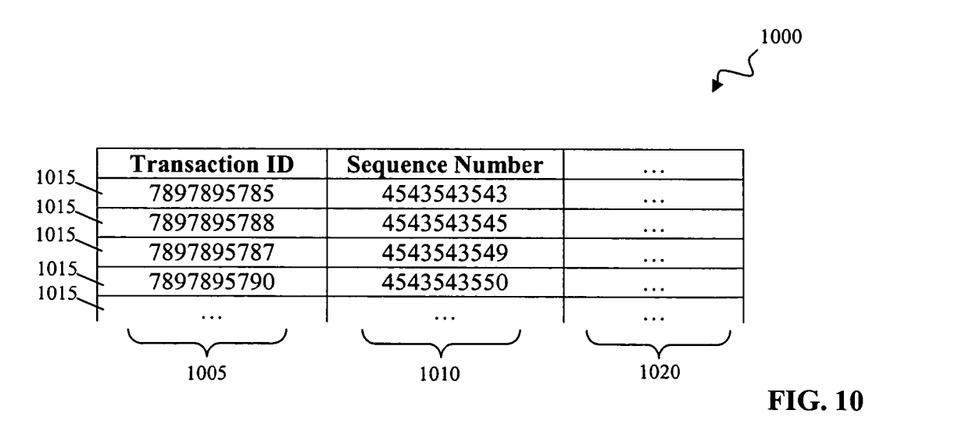
FIG. 10 shows a transaction log table where sequence numbers are associated with transaction ID's for a collection of transactions.

The system can associate the sequence number with the transaction ID at 925. For example, FIG. 10 shows a transaction log table 1000 where sequence numbers are associated with transaction ID's for a collection of transactions. In particular, transaction log table 1000 includes a transaction ID column 1005 and a sequence number column 1010 that associate sequence numbers and transaction ID's in a series of records 1015. In some implementations, transaction log table 1000 can also include additional information in one or more additional columns 1020. For example, transaction log table 1000 can identify the destination of changes made during transactions in an additional column 1020. in other implementations, separate additional tables can include transaction ID's and any such additional information.

Returning to FIG. 9, the system can commit the changes in the transaction at 930. Such a commit can make the changes to a data store permanent. The system can also release the shared lock on the sequence number source at 935.

Figure 11:
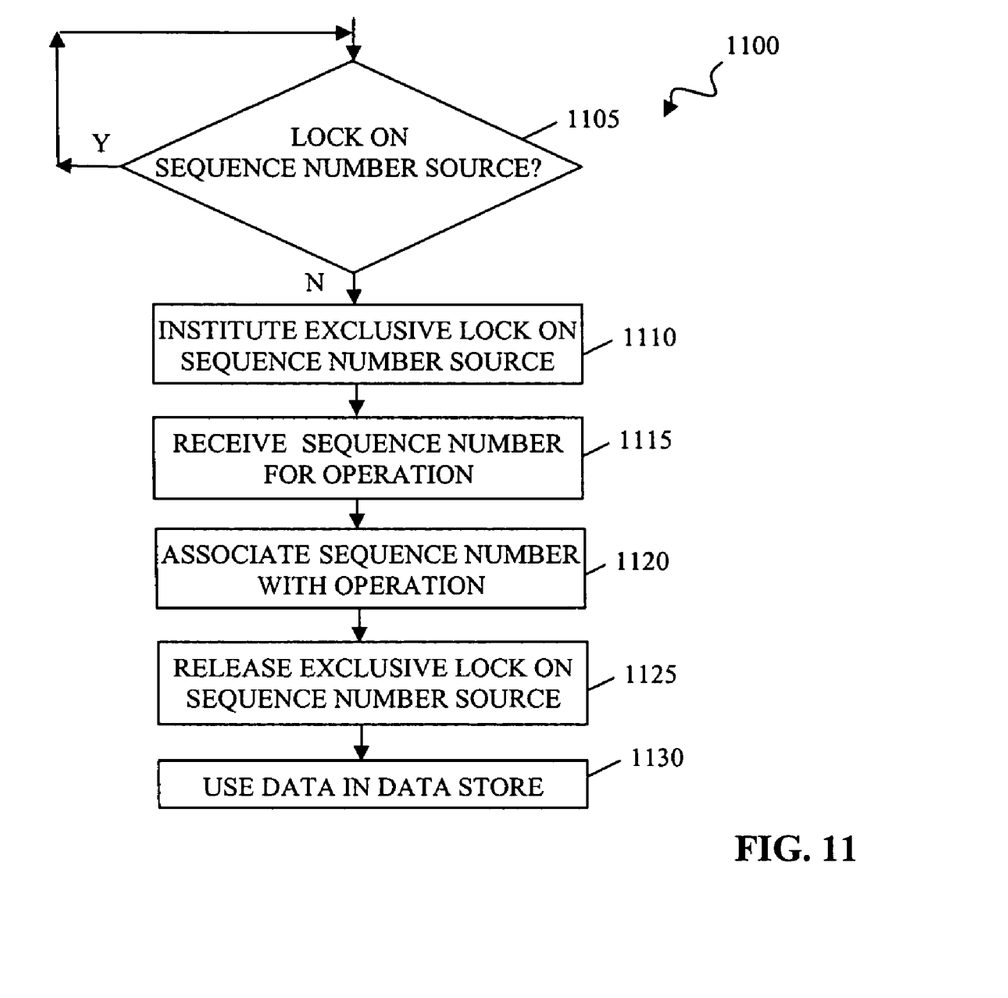
FIG. 11 is a flowchart of a process performed during an operation.

FIG. 11 is a flowchart of a process 1100 performed during an operation, such as operation 700 (FIG. 7). Additional data processing activities can be performed during an operation, however, the illustrated activities clarify the operation by example.

The system performing process 1100 can determine if there is a lock on a sequence number source at 1105 that indicates that the sequence number source is not available to provide a sequence number. Multiple operations are thus prevented from concurrently obtaining sequence numbers from the sequence number source. If it is determined that there is a lock on the sequence number source, the system can return to perform another determination until the lock is released.

As discussed above, shared locks from different transactions can overlap in time. Thus the system performing process 100 may need to check if there is a shared lock on the sequence number source several times before all overlapping shared locks have been released. Therefore, in some implementations, an appropriate delay can be built into the process flow loop surrounding the determination at 1150.

If the system determines that there is no lock, the system can institute an exclusive lock on the sequence number source at 1110. As discussed above, an exclusive lock prevents read and write access to other processes and prevents other processes from instituting a shared or an exclusive lock.

The system can also receive a sequence number for the operation at 1115. As discussed above, a sequence number is a unique and ordered identifier, such as a monotonically increasing number.

The system can also associate the sequence number with the operation at 1120. For example, if operations are logged in a transaction log such as, e.g., transaction log table 1000 (FIG. 10), the sequence number can be stored in a data record associated with the operation. The association of the sequence number with the operation can include changing a database that associates sequence numbers with operations.

For example, the association of the sequence number with the operation can be set forth in a transaction, and this transaction can be persisted and committed at 1125.

The system can also release the exclusive lock on the sequence number source at 1125 and start to use the data in a data store at 1130. The use of the data can include the performance of an operation on the data store, such as a replication, a partitioning, or a synchronization of the data store with another partition. For example, data from a first data store (such as a collection of business objects) can be replicated into a second data store (such as a data table or other schema).

Figure 12:
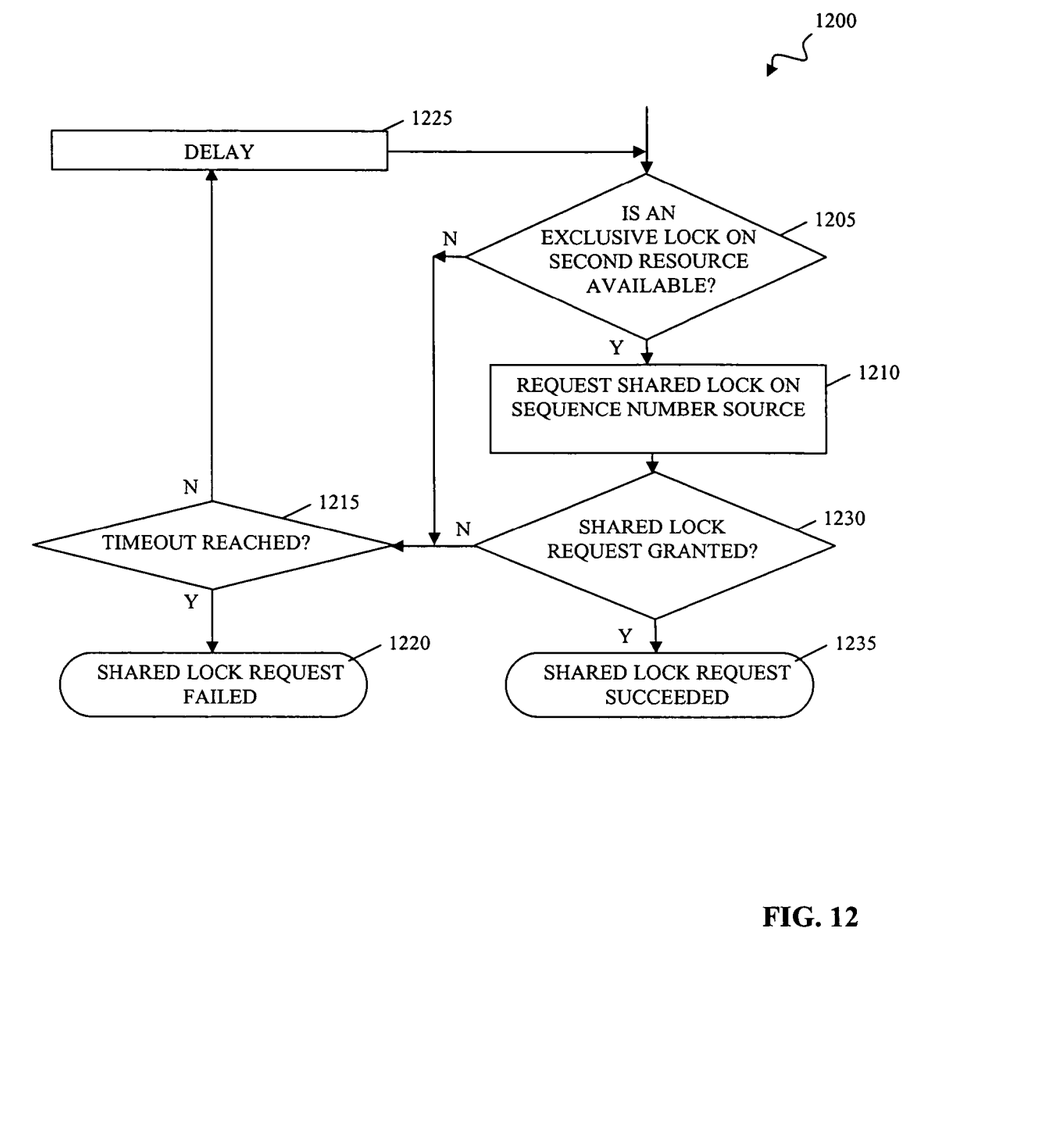
FIG. 12 is a flowchart of a process for instituting a shared lock on a source of sequence numbers.
Figure 13:
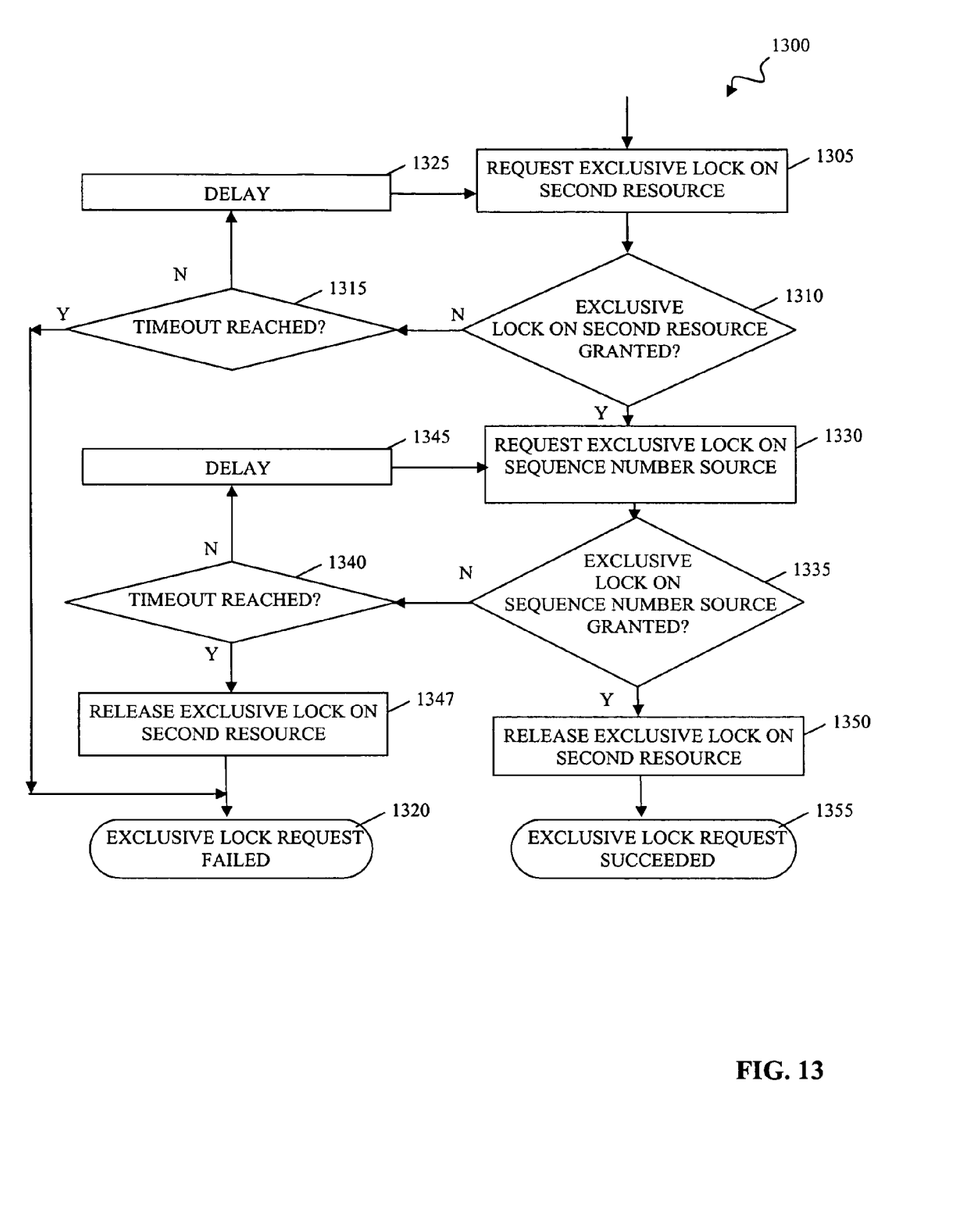
FIG. 13 is a flowchart of a process for instituting an exclusive lock on a source of sequence numbers.

FIG. 12 is a flowchart of a process 1200 for instituting a shared lock on a source of sequence numbers. FIG. 13 is a flowchart of a process 1300 for instituting an exclusive lock on a source of sequence numbers. Processes 1200, 1300 describe possible realizations of activities 915 and 1110 in more details.

Processes 1200, 1300 can be applied when the stream of transactions in a system landscape is so dense that the delay associated with an operation obtaining an exclusive lock on a sequence number source could become unacceptably large. In this regard, processes 1200, 1300 both use a second resource so that new shared lock requests can be retarded while a exclusive lock request is waiting for the release of pending shared lock requests. By locking and unlocking two resources in a defined manner, a placeholder in the stream of transactions can be established.

With reference to FIG. 12, the system performing process 1200 determines if an exclusive lock is presently available on the second resource at 1205. Such an exclusive lock is unavailable when the sequence number source is exclusively locked, e.g., by a performance of process 1300 for an operation, as discussed further below.

If the system determines that an exclusive lock is presently available on the second resource, then the system requests a shared lock on the sequence number source at 1210. Such shared locks can overlap with shared locks instituted for other transactions. However, if the system determines that an exclusive lock is not presently available on the second resource, then the system determines if a timeout for institution of a shared lock has been reached at 1215. If the timeout has been reached, the shared lock request is deemed to have failed at 1220. If the timeout has not been reached, the system delays for a suitable period at 1225 and then returns to determine if an exclusive lock is presently available on the second resource at 1205.

After the system requests a shared lock on the sequence number source at 1210, the system can determine if the shared lock request has been granted at 1230. Such a shared lock request will not be granted when the sequence number source is exclusively locked, e.g., by a performance of process 1300 for an operation, as discussed further below. If the system determines that the request has not been granted, then the system determines if a timeout for institution of a shared lock has been reached at 1215. If the timeout has been reached, the shared lock request is deemed to have failed at 1220. If the timeout has not been reached, the system delays for a suitable period at 1225 and then returns to determine if an exclusive lock is presently available on the second resource at 1205.

If the system determines that the request has been granted at 1230, then the shared lock request is deemed to have succeeded at 1235. Additional activities, such as 920, 925, 930 (FIG. 9), can be performed during the shared lock. The shared lock on the object can subsequently be released at 935.

As discussed above, FIG. 13 is a flowchart of a process 1300 for instituting an exclusive lock on a source of sequence numbers. The system performing process 1300 requests an exclusive lock on the second resource at 1305 and then determines if this request has been granted at 1310. The granting and continued existence of this exclusive lock request will prevent a system from determining that an exclusive lock on the second resource is available at 1205 and stop the stream of shared lock requests on the sequence number source at 1210 (FIG. 12). The granting and continued existence of this exclusive lock thus acts as a placeholder in the queue for the exclusive lock request that interrupts the stream of shared lock requests.

If the system performing process 1300 determines that the request for an exclusive lock on the second resource has not been granted at 1310, then the system determines if a timeout for institution of this exclusive lock has been reached at 1315. Such an exclusive lock request will not be granted when the second resource is locked. For example, the exclusive lock request will not be granted when the sequence number source is exclusively locked by a second performance of process 1300, e.g., for a second operation. If the timeout has been reached, the exclusive lock request is deemed to have failed at 1320. If the timeout has not been reached, the system delays for a suitable period at 1325 and then returns to request an exclusive lock on the second resource at 1305.

If the system performing process 1300 determines that the request for an exclusive lock on the second resource has been granted at 1310, then the system requests an exclusive lock on the sequence number source at 1330. The system can also determine if this request for an exclusive lock on the sequence number source has been granted at 1335. Such an exclusive lock request will not be granted when the sequence number source is locked. For example, the exclusive lock request will not be granted when the sequence number source is subject to a shared lock by one or more performances of process 1200 (FIG. 12), e.g., for a one or more transactions. As another example, the exclusive lock request will not be granted when the sequence number source is subject to an exclusive lock by another performances of process 1300, e.g., for another operation.

If the system performing process 1300 determines that the request for an exclusive lock on the sequence number source has not been granted at 1335, then the system determines if a timeout for institution of this exclusive lock has been reached at 1340. If the timeout has been reached, the exclusive lock on the second resource is release at 1347 and the exclusive lock request is deemed to have failed at 1320. If the timeout has not been reached, the system delays for a suitable period at 1345 and then returns to request an exclusive lock on the sequence number source at 1330.

If the system performing process 1300 determines that the request for an exclusive lock on the sequence number source has been granted at 1335, then the system releases the exclusive lock on the second resource at 1350. In the context of FIG. 12, this release will make the second resource available for an exclusive lock check as determined at 1205. However, while the exclusive lock on that sequence number source is maintained, requests for shared locks on the object at 1210 will be denied or delayed.

After the system releases the exclusive lock on the second resource at 1350, the exclusive lock request is deemed to have succeeded at 1355. Additional activities, such as 1115, 1120 (FIG. 11), can be performed during the exclusive lock. The exclusive lock on the sequence number source can subsequently be released at 1125. In the context of FIG. 12, this allows requests for shared locks on the sequence number source made at 1210 to be granted.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. All process activities need not be performed in the same order and yet useful results can still be achieved. For example, in process 1100 (FIG. 11), data in a data store can be used by an operation before an exclusive lock on a sequence number source is released.

Accordingly, other implementations are within the scope of the following claims.

What is claimed is:

1. An article comprising one or more tangible machine-readable storage media storing instructions operable to cause one or more machines to perform operations comprising:
 obtaining, before a transaction is committed, a first identifier that is unique but not necessarily ordered;
 associating the first identifier with the transaction;

obtaining, after the first identifier has been obtained, a first sequence identifier that is both unique and ordered;

associating the sequence identifier with the first identifier and with the transaction;

preventing an operation from obtaining a second sequence identifier until after the first sequence identifier has been obtained by preventing other processes from accessing a source of sequence numbers by instituting an exclusive lock on the source of sequence numbers, the exclusive lock being a state of a corresponding data record in which read and write accesses are available only to a single process such that other exclusive locks or shared locks cannot be instituted for that data record, the source of sequence numbers configured to be accessed by multiple concurrent transactions when the multiple concurrent transactions issue overlapping shared locks, the shared locks preventing the executing process from issuing the exclusive lock;

the transactions each comprising a group of related changes to a data store, the operation comprising one or more data processing activities in which the data store is used;

wherein a granted and continued existence of an exclusive lock on a second resource stops requests for the shared locks on the source of sequence numbers;

wherein an exclusive lock request for the second resource will not be granted when the source of sequence numbers is subject to an exclusive lock of another process;

wherein an exclusive lock on the second resource is released after it is determined that an exclusive lock on the source of sequence numbers has been granted;

wherein use of the second resource retards new shared lock requests while an exclusive lock request is waiting for release of pending shared lock requests.

2. The article of claim 1, wherein the operations further comprise preventing an operation from obtaining a second sequence identifier until after the transaction has been committed.

3. The article of claim 1, wherein associating the sequence identifier with the first identifier comprises writing the sequence identifier and the first identifier to a transaction log.

4. An article comprising one or more tangible machine-readable storage media storing instructions operable to cause one or more machines to perform operations comprising:

determining if a change is being made to a data store in connection with a transaction, the transaction comprising a group of related changes to a data store;

preventing other processes that interact with the data store in connection with an operation from obtaining sequence numbers from a source of sequence numbers if it is determined that no change is being made by instituting an exclusive lock on the source of sequence numbers, the exclusive lock being a state of a corresponding data record in which read and write accesses are available only to a single process such that other exclusive locks or shared locks cannot be instituted for that data record, the operation comprising one or more data processing activities in which the data store is used, the source of sequence numbers configured to be accessed by multiple concurrent transactions when the multiple concurrent transactions issue overlapping shared locks, the shared locks preventing the executing process from issuing the exclusive lock;

obtaining a sequence number for an operation from the source of sequence numbers; and releasing the source of sequence numbers so that other processes can obtain sequence numbers from the source of sequence numbers;

wherein a granted and continued existence of an exclusive lock on a second resource stops requests for the shared locks on the source of sequence numbers;

wherein an exclusive lock request for the second resource will not be granted when the source of sequence numbers is subject to an exclusive lock of another process;

wherein an exclusive lock on the second resource is released after it is determined that an exclusive lock on the source of sequence numbers has been granted;

wherein use of the second resource retards new shared lock requests while an exclusive lock request is waiting for release of pending shared lock requests.

5. The article of claim 4, wherein determining if the change is being made to the data store comprises determining if a transaction has instituted a shared lock on the source of sequence numbers.

6. The article of claim 4, wherein the operations further comprise replicating data in the data store after the other processes are prevented from obtaining sequence numbers from the source of sequence numbers.

7. An article comprising one or more tangible machine-readable storage media storing instructions operable to cause one or more machines to perform operations comprising:

identifying transactions performed on a data store using first identifiers that are unique but not necessarily ordered, wherein each first identifier is associated with a single transaction; and sequencing the transactions and operations using sequence identifiers that are both unique and ordered, wherein each sequence identifier is associated with a single transaction or a single operation by selectively instituting an exclusive lock on a source of the sequence identifiers, the exclusive lock being a state of a corresponding data record in which read and write accesses are available only to a single process such that other exclusive locks or shared locks cannot be instituted for that data record, the source of sequence identifiers configured to be accessed by multiple concurrent transactions when the multiple concurrent transactions issue overlapping shared locks, the shared locks preventing the executing process from issuing the exclusive lock;

wherein a granted and continued existence of an exclusive lock on a second resource stops requests for the shared locks on the source of sequence numbers;

wherein an exclusive lock request for the second resource will not be granted when the source of sequence numbers is subject to an exclusive lock of another process;

wherein an exclusive lock on the second resource is released after it is determined that an exclusive lock on the source of sequence numbers has been granted;

wherein use of the second resource retards new shared lock requests while an exclusive lock request is waiting for release of pending shared lock requests.

8. The article of claim 7, wherein both the first identifiers and the sequence identifiers comprise time stamps.

9. The article of claim 7, wherein the sequence identifiers for the transactions and the operations are obtained from a same function.

10. The article of claim 7, wherein the operations further comprise storing a specific first identifier associated with a specific transaction in association with a specific sequence identifier for the same specific transaction.

11. The article of claim 10, wherein storing the specific first identifier in association with the specific sequence identifier comprises storing the specific first identifier and the specific sequence identifier together in a record in a transaction log.

12. An article comprising one or more tangible machine-readable storage media storing instructions operable to cause one or more machines to perform operations comprising:
obtaining a first sequence number for a first transaction from a sequence number source, including
preventing an operation from obtaining a second sequence number for a first period of time;
allowing, during the first period of time, one or more additional transactions to obtain additional sequence numbers and to prevent the operation from obtaining the second sequence number for additional periods of time, wherein the additional periods of time overlap with the first period of time;
obtaining, when the first period of time and any additional periods of time have ended, the second sequence number for the operation, wherein obtaining the second sequence number comprises preventing other transactions from obtaining sequence numbers by selectively instituting an exclusive lock on a source of the sequence numbers, the exclusive lock being a state of a corresponding data record in which read and write accesses are available only to a single process such that other exclusive locks or shared locks cannot be instituted for that data record, the source of sequence numbers configured to be accessed by multiple concurrent transactions when the multiple concurrent transactions issue overlapping shared locks, the shared locks preventing the executing process from issuing the exclusive lock,
wherein the sequence numbers are used by a data processing system to sequence transactions and operations, the transactions each comprising a group of related changes to a data store, the operation comprising one or more data processing activities in which the data store is used;
wherein a granted and continued existence of an exclusive lock on a second resource stops requests for the shared locks on the source of sequence numbers;
wherein an exclusive lock request for the second resource will not be granted when the source of sequence numbers is subject to an exclusive lock of another process;
wherein an exclusive lock on the second resource is released after it is determined that an exclusive lock on the source of sequence numbers has been granted;
wherein use of the second resource retards new shared lock requests while an exclusive lock request is waiting for release of pending shared lock requests.

13. The article of claim 12, wherein the operations further comprise always committing the first transaction during the first period of time.

* * * * *